June 2, 1925.

H. E. SHELLER

STEERING WHEEL

Filed Jan. 15, 1923

Inventor
Harry E. Sheller
By Bacon & Thomas
Attorneys

June 2, 1925.

H. E. SHELLER

STEERING WHEEL

Filed Jan. 15, 1923

Inventor
Harry E. Sheller

Patented June 2, 1925.

1,540,292

UNITED STATES PATENT OFFICE.

HARRY E. SHELLER, OF PORTLAND, INDIANA.

STEERING WHEEL.

Application filed January 15, 1923. Serial No. 612,714.

*To all whom it may concern:*

Be it known that I, HARRY E. SHELLER, a citizen of the United States, residing at Portland, in the county of Jay and State of Indiana, have invented certain new and useful Improvements in Steering Wheels, of which the following is a specification.

The invention relates to improvements in steering wheels particularly adapted for use in connection with motor vehicles.

It is an object of the invention to provide a steering wheel having a plastic rim firmly connected to the radial metallic spokes thereof.

I have recognized that most desirable advantages result from the use of a steering wheel wherein the plastic material of which the wheel is composed fills in a space formed by reducing the ends of the spokes both along the top surfaces and along the sides so as to provide adjacent the plastic rim plastic gripping portions, the edges of which are flush wih the exposed portions of the metallic spokes.

From a more specific aspect, the invention comprises a steering wheel having the usual metallic spokes, which, however, for a portion of their lengths both along the upper and lower surfaces and along each edge are reduced to provide a space to receive the plastic material from which the outer rim is composed. The spokes are likewise formed with openings receiving the plastic material to assist in anchoring the rim in position. When the plastic material fills the spaces formed by reducing the surfaces and edges of the spokes, the said layer of plastic substance lies flush with the exposed metal surfaces of said spokes.

In the accompanying drawings, I have shown several embodiments of my invention, in which—

Figure 1:
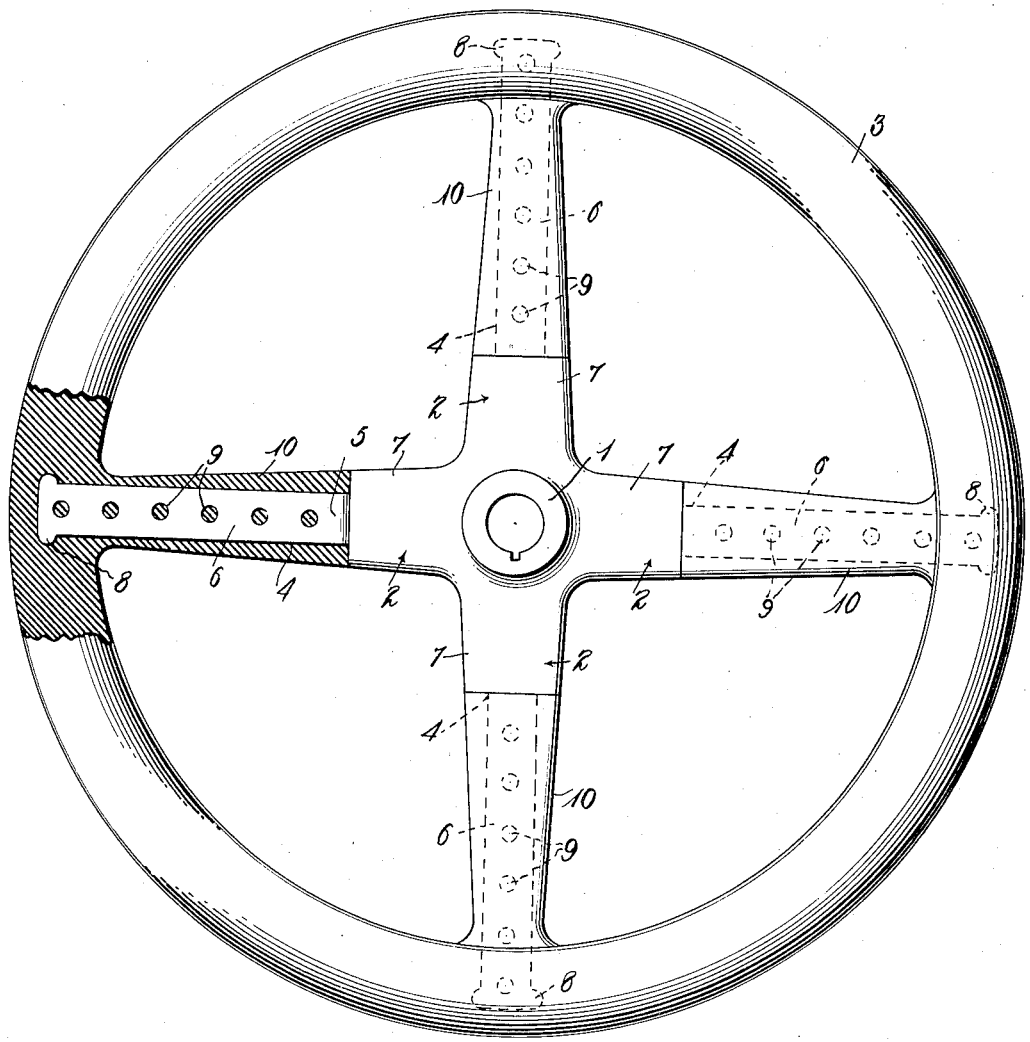
Fig. 1 illustrates a preferred form of the invention.

Referring now more particularly to the drawing wherein like reference characters indicate corresponding parts, the numeral 1 designates the usual hub of a steering wheel, having the radial metallic spokes 2 projecting therefrom. 3 designates the rim of the wheel which is preferably composed of a plastic material such as vulcanized rubber or the like.

Figure 2:
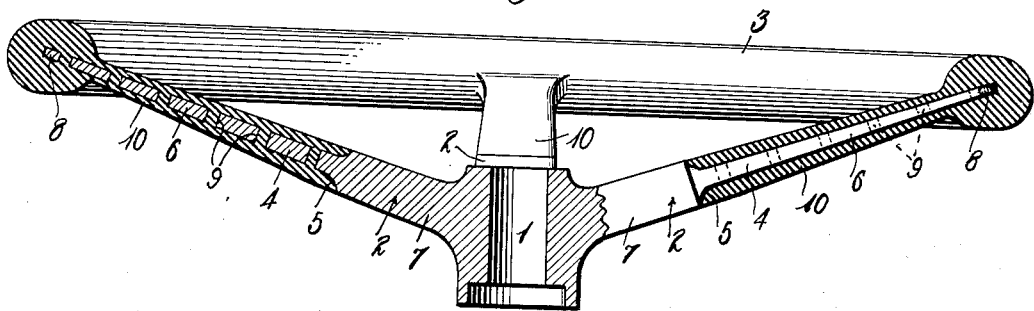
Fig. 2 is a detail view.

I have found that it is particularly advantageous to provide along the spokes 2 a plastic gripping surface which may be gripped by the driver when using the wheel. Such a surface is more desirable than a cold metallic surface, and furthermore, the plastic material offers an antislip gripping space. As shown in detail in Fig. 2, I have provided a means whereby the plastic material extends a considerable distance inward along the spokes and presents in combination therewith a flush surface so as to present no unsightly appearance or an objectionable obstruction. To accomplish these ends, a portion of each spoke for a considerable distance is reduced in diameter along the edges 4, and also reduced in thickness as designated by the character 5, this end portion of each spoke designated as a whole by the character 6, being of a substantially less width and thickness than the portion 7 of the spoke. Each spoke is likewise formed with an anchoring part 8, which is usual in wheels of this kind, and is also formed with a plurality of openings 9 which are adapted to receive plastic material when a plastic rim is anchored to the spokes to assist in holding the rim in position. As before stated, the rim 3 is composed of vulcanizable material which is preferably placed upon the spokes when in an unvulcanized condition, and then vulcanized to thereafter harden about the ends of the spoke and to become anchored thereto.

A salient feature of this invention consists in providing along the portion 6 of each spoke a layer or coating of plastic material 10. This material is preferably the same as the wheel 3 and is so moulded that it fills up the reduced portion 6 of the spokes 2 so as to present a plastic surface which may be readily grasped by a driver, yet at the same time the edges of the coating, as indicated by the character X, lie flush with the surfaces of the shoulder portion of each spoke 7. This construction readily permits a free grasping of the inwardly extending plastic material, which is most desirable to some drivers, yet does not necessitate the provision of an upstanding shoulder at the point where the plastic material terminates. The plastic material from the inwardly extending coating or layer also fills the apertures 9 to assist in anchoring the rim in position.

Figure 3:
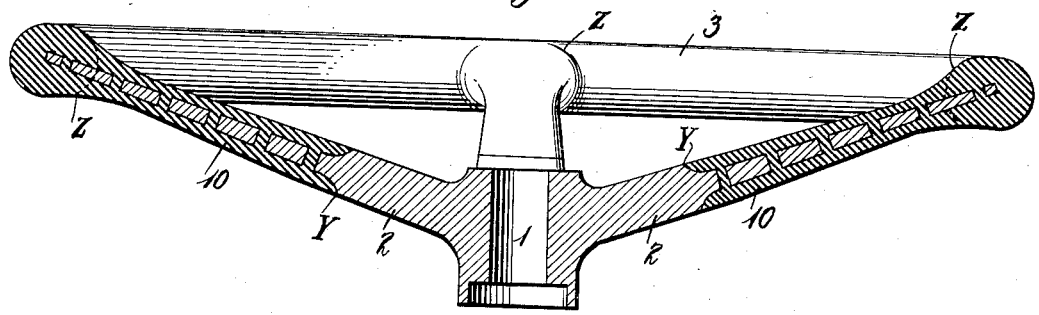
Fig. 3 is a view of a modified form.

As shown in Fig. 3 of the drawings, the surface of the plastic layer 10 projecting from the rim 3 at the point Y lies flush with the enlarged shoulder portion of each spoke, and said layer 10 gradually increases in thickness so as to merge at the point Z with the rim 3 of the wheel. This offers a most convenient gripping surface and materially adds to the attractiveness of the wheel. Otherwise, the modified form is the same as shown in Fig. 1.

From the foregoing, it will be seen that I have provided a steering wheel wherein the spokes are reduced near one end thereof, both in thickness and in width, to provide a shoulder, and that I thereafter mould around each of said reduced portions a layer of plastic material, the inner edge of which lies flush with the surface of the spoke at the shoulder so as to present a smooth and continuous surface, while the outer edge of each layer or coating 10 is integral with the steering wheel rim and may merge into said rim if desirable by gradually increasing the thickness thereof. The plastic coating or covering 10 may extend for different distances along the length of each spoke, but it preferably extends a sufficient distance to permit the desired gripping space needed under any and all conditions.

It will likewise be apparent that the plastic rim may be composed of other substances and that the spokes may be constructed of any desired material.

Figure 4:
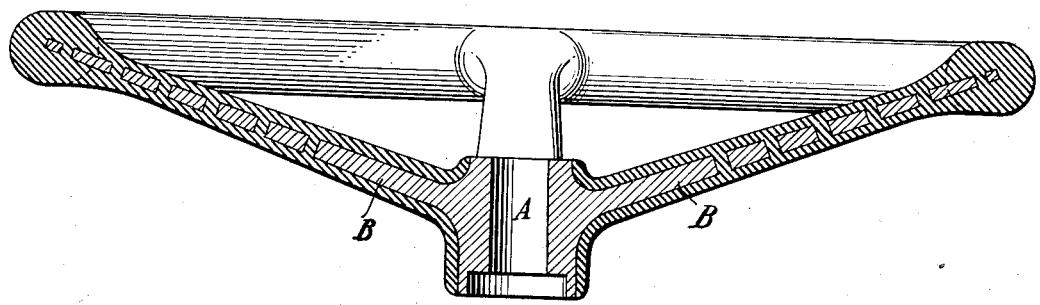
Fig. 4 is a view of another modified form.

In Fig. 4 I have shown another modification of the invention, wherein the plastic coating is disclosed as entirely surrounding the hub A of the wheel and the spokes B. This gives the wheel the appearance of an all-plastic wheel, having the edges of the plastic gripping surfaces and the plastic hub, with the interior strengthening metallic spokes and hub. Of course, the hub can, if desirable, be free of the plastic coatings, in which event the coating would only extend to said metallic hub.

Having thus described my invention, what I claim is:

A steering wheel having a metallic hub, and metallic spokes radiating therefrom each of said spokes being abruptly reduced in cross-sectional area at a point intermediate its ends, the reduced portions of said spokes being perforated and terminating in unconnected ends, a rim of plastic material fitted to said unconnected spoke ends to form a wheel, the plastic material of said rim extending inwardly around the reduced portions of said spoke, the layers of plastic material surrounding the reduced portions of said spokes, gradually increasing in thickness so as to merge with the wheel rim, the outer surface of the plastic material forming with the outer surface of the enlarged portions of said spokes a continuous smooth surfaced spoke from the rim to the hub of the wheel, the plastic material being anchored to the metallic spokes by engaging in the apertures therein.

In testimony whereof I affix my signature.

HARRY E. SHELLER.